Figure 1:
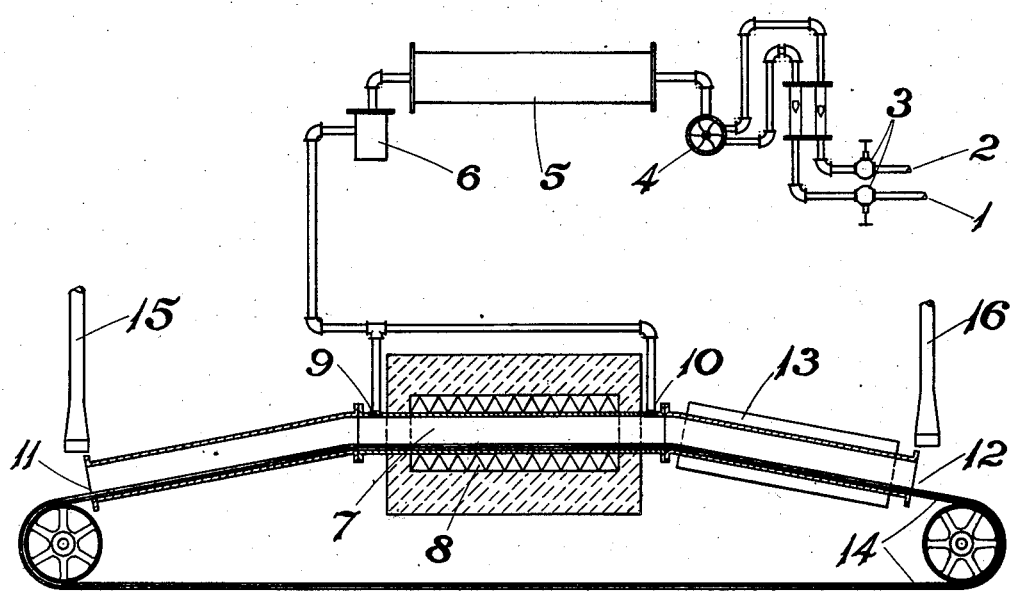

Jan. 13, 1942.　　　D. R. KISER　　　2,269,943
METHOD FOR MANUFACTURING BLACKENED STEEL ELECTRODES
Filed Dec. 8, 1939

Darwin R. Kiser
INVENTOR.

BY John J. Logan
ATTORNEY

Patented Jan. 13, 1942

2,269,943

UNITED STATES PATENT OFFICE 2,269,943

METHOD FOR MANUFACTURING BLACKENED STEEL ELECTRODES

Darwin R. Kiser, Emporium, Pa.

Application December 8, 1939, Serial No. 308,180

8 Claims. (Cl. 148—16)

This invention relates to methods of making blackened steel electrodes as used in electron discharge devices, and to the methods of coating the surface of steel parts with a black iron oxide.

It is well-known in the art of electron discharge devices that a blackening of the surfaces of electrodes and other metal parts increases their heat radiating efficiency and decreases their secondary electron emission. This increase of heat radiation becomes more and more important where, as in the case of radio receiving tubes, the trend is towards smaller tube sizes.

Up to the present time, most of the electrodes in electron discharge devices, in particular in radio receiving tubes, have been made of nickel. Recently, iron and steel electrodes have begun to replace the nickel electrodes, but great difficulty has been experienced in utilizing the known methods of blackening nickel electrodes and other nickel parts, in the blackening of steel electrodes or steel parts.

Known methods of blackening the surface of electrodes are practicable for nickel only. One class of methods for blackening nickel electrode surfaces comprises what is known as "carbonizing." In carbonizing, an adherent carbon-coating is deposited on the nickel surface, either by exposure of the surface to a hydrocarbon atmosphere at elevated temperature, or by coating with finely divided carbon suspended in oil. The exposure of steel to a hydrocarbon atmosphere at elevated temperature carburizes the steel and changes its ductility and elastic properties in an undesirable manner.

This difficulty is avoided according to the invention by providing a blackened steel electrode which is coated with a stable black iron oxide. Though a nickel electrode coated with a stable black nickel oxide is known, no steel electrode with a black iron oxide coating, which is stable for all the requirements of processing and operating electron discharge devices, e. g. radio receiving tubes and the like, was known prior to this invention.

The new blackened steel electrode for electron discharge devices is produced by exposing its surface to a mixture of CO, $CO_2$, $H_2$, $H_2O$, eventually diluted in $N_2$, at elevated temperature. A mixture of these gases in contact with iron or steel and their oxides, causes a reversible reaction, depending on temperature and the proportions of the components of the gas mixture. Several iron oxides may be formed on the pure metal surface, or the oxides may be reduced to the pure metal by a proper control of the components and the temperature. I have discovered that a black oxide of iron, which is produced in this manner is stable enough to withstand the high requirements of stability which must be met during the production and operation of electron discharge devices, e. g. radio receiving tubes and the like.

The steel parts for radio tubes coated with this black, stable iron oxide, which adheres very firmly to the surface of the steel electrodes, are superior to the ordinary carbonized nickel parts because of the difficulty of carbonizing the nickel parts so that the surface is free from loose carbon particles, which particles frequently result in noisy operation of the electron discharge devices in which they are used.

It is believed that the reaction for obtaining the desired black iron oxide $Fe_4O_4$ in the gas mixture described above on the surface of the steel electrode takes place as follows. The cleaning of the undesirable, unstable iron oxides in the atmosphere is due to the proper proportions of $H_2$ and $H_2O$ in the atmosphere, while, simultaneously, the desirable, stable black oxide is produced at the steel surface by the proper proportions of CO and $CO_2$. The proper temperature and the best proportions for the gas mixture were chosen to achieve the desired reaction as a general guide. After the proper region in the reaction diagrams had been found, further experiments and life tests with special electron discharge tubes into which the oxidized steel parts were mounted, gave more accurate limitations as to the temperature range and furnished indications for a simple and cheap production of the desired proportions of the components of the oxidizing atmosphere.

Accordingly, it is a principal object of the invention, to provide a blackened steel electrode for electron discharge devices, which electrode is coated with an iron oxide of the stability needed in the operation of these tubes.

Another object of the invention is to provide a blackened steel electrode for electron discharge devices, which is free from the loose carbon met in carbonized metal electrodes, such as nickel electrodes thus avoiding the noisy operation of the discharge tubes resulting from loose carbon.

Another principal object of the invention is to provide a method, by which steel electrodes can be cleaned from unstable oxides, and coated with a dark, stable iron oxide.

A feature of the invention relates to the elimination of the expensive carbonizing process formerly necessary to obtain blackened electrodes.

Another feature of the invention relates to a combined cleaning and oxidizing procedure which may be used in the manufacture of parts used in the radio tube industry.

Another object of the invention relates to the process whereby the regions in the reaction diagrams of $CO$—$CO_2$ and $H_2$—$H_2O$ mixtures with iron and its oxides are specially chosen so as to produce the desired black stable oxide coating.

Another feature of the invention relates to a practical method, in which the desired proportions of the components of the cleaning and oxidizing gas mixture may be obtained.

In the drawing, Fig. 1 represents in diagrammatic form a typical layout of apparatus for practicing the invention.

Figure 2:
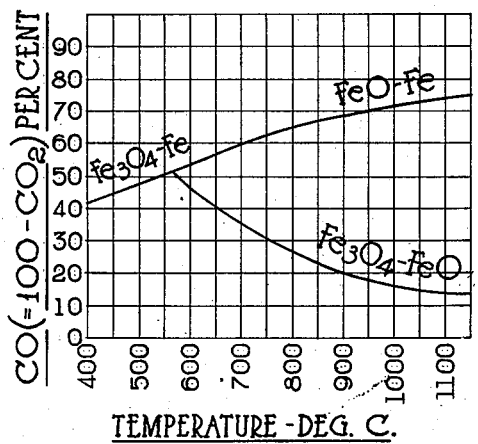
Figure 3:
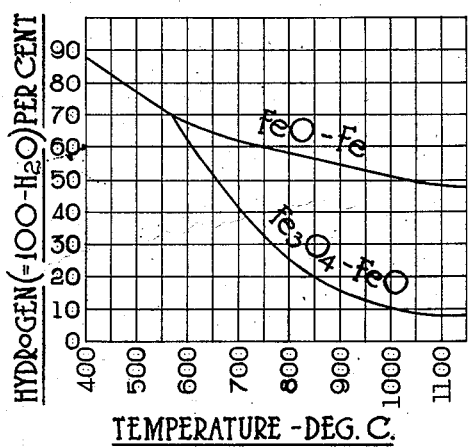

Figs. 2 and 3 are curve diagrams explanatory of the invention.

While up to several years ago practically all metal parts mounted in electron discharge tubes were deoxidized (or reduced) by firing in hydrogen, a controlled atmosphere substantially composed of $CO$, $CO_2$, $H_2$, $H_2O$ and $N_2$ is used today for this purpose, because it can be obtained from various raw gases at low cost. For the purpose of reducing oxidized metal surfaces it is essential to have a high ratio of $CO$ to $CO_2$ and of $H_2$ to $H_2O$. In cracking the raw gases (preferably natural gas if available), by incomplete combustion in the presence of a catalyzer it is possible to increase the $H_2$ and $CO$ percentage of the combustion products which should be high for the purpose of reducing. The combustion gases from such a gas cracker are piped into a cleaning furnace, and the oxidized metal parts which have to be reduced are fired at the proper temperature in the presence of this atmosphere which is artificially enriched in $H_2$ and $CO$.

Referring to the drawing, there is shown in schematic form a gas inlet 1, and an air inlet 2, which are provided with suitable flow meters and valves 3, leading to an air-gas mixer 4, of any well-known construction. The mixer 4 feeds the atmosphere controller 5 which may consist of any well-known form of gas-cracking apparatus containing a suitable catalyser well-known in the gas-cracking art. By means of the valves 3, the ratio of gas-to-air may be adjusted and therefore, the degree of combustion of the mixture in the controller 5 may be regulated. The mixture of the combustion products from the controller 5 may then be passed through a suitable cooling arrangement 6 from which they pass to the reducing furnace consisting of a muffle 7, surrounded by a heater 8 of either the gas or electric type. The muffle 7 is preferably horizontal as shown and connected to the controller 5 at the inlet ends 9, 10. Muffle 7 is provided with an inclined inlet 11 and an inclined outlet 12 preferably surrounded by a water-jacket 13. An endless conveyor belt 14 carrying the metal parts to be blackened passes through the furnace in the direction of the arrow. Preferably, the inlet and outlet ends of the furnace are provided with exhaust pipes or vents 15, 16. Preferably, the gas inlet 1 is connected to a source of natural gases although any raw gas such as referred to in "Industrial Electric Heating" by N. R. Stensel, page 216 (John Wiley & Sons, 1933) may be employed.

The above-described equipment may be used to obtain the mixture of the combustion products from the cracker, which will clean up the unstable iron oxides and produce the stable oxide. By making the combustion of the raw gas more complete, it is theoretically possible to decrease the ratio of $CO$ to $CO_2$ to such an extent that the region of the stable iron oxide $Fe_3O_4$ in the reaction diagram Figure 2 is obtained. There are, however, several reasons why the combustion cannot be made complete. This would in the first place decrease the $H_2$ component required for cleaning up the unstable oxides. Furthermore, the temperatures reached by complete or nearly complete combustion are so high that they endanger the life of the combustion chamber.

In order to obtain a gas mixture in which the proportions of $H_2$ to $(H_2+H_2O)$ is in the region above 50% to 60%, and the proportion of $CO$ to $(CO+CO_2)$ below 30% or even below 15%, which from inspection of Figures 2 and 3 is the region for obtaining the desired oxide surface on steel at temperatures between 750° C. and 1150° C., the hydrogen content has to be kept high, and the combustion ratio should not be too high. In Fig. 2, the ordinates represent percentage of $CO$ in the mixture $(CO+CO_2)$ while in Fig. 3, the ordinates represent percentage of $H$ in the mixture $(H_2+H_2O)$. The region of the diagrams above the curves is the region in which the iron oxides are reduced to iron. The region below all the curves is that in which iron or iron oxides react to form the stable iron oxide $Fe_3O_4$. The region between the two curve branches open at the right side and meeting at about 52% $CO$ for 570° C. (Fig. 2) is the region for which the iron oxide is stable in contact with the atmosphere. The dotted parts of the curves in both figures indicate that the exact location of the "equilibrium curves" is not known. It will be understood of course that the "equilibrium curves" represented by the dotted portions are qualitative only, although for all practical purposes in the manufacture of radio receiving tubes, the general range as illustrated in Figs. 2 and 3, can be used to practical advantage.

In order to obtain the necessary proportions of the components of the gas mixture, I have found that it is satisfactory to add about 4% of air to the gas mixture obtained by comparatively incomplete combustion, and that the oxygen so added will, under the conditions in the firing furnace, oxidize enough of the $CO$ to $CO_2$, so as to yield the desirable low $CO$ content, while the formation of water from the admitted air and the hydrogen present in the mixture is not large enough to prevent the cleaning up of the undesirable stable oxides. This is probably due to a catalytic action in the firing furnace in combination with the tendency of water to dissociate at higher temperatures.

The air to natural gas ratio introduced in the mixing chamber should be so adjusted, that the combustion gases, after leaving the cracker, contain (as compared with the total atmosphere containing up to 80% $N_2$), about 7% $H_2$, 6% $CO$ and 8% $CO_2$. It is not feasible to specify the mixing ratio of natural gas and air in the combustion chamber, because the resulting atmosphere after combustion depends to a certain extent on the kind and condition of the catalyst used for increasing the $H_2$ and $CO$ contents of the resulting atmosphere.

The above description for obtaining the desired atmosphere relates of course, only to that feature of the invention, which deals with a simple method of obtaining the required atmosphere from the combustion of raw gases which are essentially composed of methane and other hydrocarbon gases.

The atmosphere with the proper proportions of the components may, according to the invention, be obtained in any suitable manner, say by mixing the bottled gases in the proper proportion, or by adding e. g., the proper amount of $CO_2$, and water vapor to some of the raw gases, which do already contain the desired components only.

If this is being done, it is advisable to add a large percentage of nitrogen, so as to make it up to 80% of the mixture, in order to keep the running speeds and temperatures near the usual firing specifications, as this will assist in keeping the regular production schedule unchanged.

I have found that running speeds of the conveyor belt of about 5" to 10" per minute and a firing temperature of about 1140° C. gives about the best results in the particular furnace used in our production.

Any firing temperature between 750° C. and 1200° C. and proportions of the components of the controlled atmosphere which falls between 30% and less for the ratio CO to $(CO+CO_2)$ and between 50% and higher for the ratio $H_2$ to $(H_2+H_2O)$, and any desirable proportion of nitrogen is considered to be within the scope of the invention. It will be understood of course that the invention is not limited to any particular character of surface for the steel parts that are acted on in the furnace although it is preferable to employ sand-blasted steel. While the invention is applicable to blackening of any of the steel metal parts of a radio receiving tube, it is particularly advantageous when applied to the blackening of the well-known "cage" electrodes or "plate" electrodes of radio receiving tubes generally. While in the foregoing, the desired stable oxide is preferably obtained by means of an atmosphere which contains above 15% CO (Fig. 2) and 50% $H_2$ (Fig. 3). It is possible to obtain a satisfactory stable oxide by employing less than 15% CO (Fig. 2) and less than 10% $H_2$ (Fig. 3) by cooling the atmosphere entering the inlets 9 and 10 to a suitably lower temperature for example by a refrigerator, in which event the temperature within the furnace should be of the order of 1150° C. or even higher (corresponding to the lower temperature of the cooled atmosphere) thus increasing the combustion ratio in the furnace resulting in a decrease of the $H_2$ content.

What I claim is:

1. The method of preparing a blackened steel electrode for electron discharge tubes and the like which includes the steps of, heating the electrode in an atmosphere containing ($H_2$, $H_2O$) and $CO_2$ to form a stable black iron oxide on the surface of the electrode and simultaneously to prevent the formation of unstable iron oxides thereon, the ratio of $H_2$ to $(H_2+H_2O)$ being from 50 to 60%.

2. The method of preparing a blackened steel electrode for electron discharge tubes and the like which includes the steps of, heating the electrode in an atmosphere containing ($H_2$, $H_2O$) and (CO, $CO_2$) wherein the $H_2$ is at least 50% of the ($H_2$, $H_2O$) and the CO is less than 30% of the (CO, $CO_2$).

3. The method according to claim 2 in which the electrode is heated within the temperature range from approximately 750° C. to approximately 1200° C.

4. The method of preparing a blackened steel electrode for electron discharge tubes and the like which includes the steps of, preparing an atmosphere consisting mainly of an inert gas and a mixture of $H_2$, CO and $CO_2$, wherein the $H_2$ is about 7% and the CO about 6%, and heating the electrode in said atmosphere at a temperature in the range between approximately 750° C. and approximately 1200° C.

5. The method according to claim 4 in which the said inert gas is nitrogen.

6. The method of blackening steel parts for use within a radio tube and the like which includes the steps of, preparing an atmosphere containing (CO, $CO_2$) and ($H_2$, $H_2O$), wherein the ratio of CO/(CO, $CO_2$) is 30% or less, and the ratio $H_2$/($H_2$, $H_2O$) is at least 50%, and heating the steel parts in said atmosphere at a temperature within the range of approximately 750° C. to approximately 1200° C.

7. The method of coating a steel strip which includes the steps of heating the strip in an atmosphere containing a mixture of (CO, $CO_2$) and ($H_2$, $H_2O$), adjusting the mixture so that the CO and $H_2$ are present in predetermined ratios to form a firmly adherent coating of black iron oxide on the surface of the strip and without materially hardening or embrittling the strip, the ratio of $H_2$ to $(H_2+H_2O)$ being from 50 to 60%.

8. The method according to claim 7 in which the said strip is heated in said mixture within a muffle surface at a temperature above 1150° C., said mixture being cooled prior to its entry into said furnace to increase the proportion of $H_2$ to $H_2O$ in the furnace.

DARWIN R. KISER.